APPARATUS FOR ANALOG-TO-DIFUNCTION CONVERSION

Filed June 21, 1956 2 Sheets-Sheet 1

INVENTOR.
Daniel L. Curtis
By Seymour M. Rosenberg
Attorney.

May 5, 1959 D. L. CURTIS 2,885,663

APPARATUS FOR ANALOG-TO-DIFUNCTION CONVERSION

Filed June 21, 1956 2 Sheets-Sheet 2

INVENTOR.
Daniel L. Curtis

By Seymour M. Rosenberg
Attorney

United States Patent Office 2,885,663
Patented May 5, 1959

2,885,663

APPARATUS FOR ANALOG-TO-DIFUNCTION CONVERSION

Daniel L. Curtis, Manhattan Beach, Calif., assignor to Litton Industries of California, Beverly Hills, Calif.

Application June 21, 1956, Serial No. 592,963
17 Claims. (Cl. 340—347)

This invention relates to analog-to-difunction converters and more particularly to a converter for translating an applied analog input signal to an equivalent difunction output signal train.

In contrast to conventional digital computing machines which operate upon binary or binary-coded signals rep-representing weighted binary digits, a new class of electronic digital computing elements has been recently developed for performing operations upon and in response to difunction signal trains. A difunction signal train, as the term is herein used, refers to a train of signals each signal of which has either a first value representing a first number or a second value representing a second number, the value of the difunction signal train being equal to the average value of the signals of the train.

A difunction signal train is readily distinguishable from a conventional binary or binary-coded signal train. Whereas in a binary or binary-coded signal train, each signal of the train has a weight or significance dependent upon its position in the signal train in accordance with a pre-assigned number code, each equi-valued signal of a difunction signal train has equal significance wherever it may appear. Accordingly, a difunction signal train may be termed a non-numerical representation of the quantity which the train represents, since the signals are not weighted according to any numbering system, or in other words, have no radix as this term is customarily employed.

As will become apparent from the ensuing description, the numbers assigned to the signals of a difunction signal train are chosen for convenience only, the nature of difunction signals in no way limiting the choice. It is conducive to simplicity in explanation of the difunction converter of the present invention, however, to assign at the outset convenient algebraic numbers to the signals of a difunction signal train. Accordingly, it is assumed herein that the signals of a difunction train may be assigned either of two sets of values, where the first set of values are +1 and −1 and the second set of values are +1 and 0. A difunction signal train wherein the signals of the train are assigned either a +1 or a −1 value is hereinafter referred to as a bipolar difunction signal train since both positive and negative quantities, i.e. positive and negative input analog signals may be conveniently represented by the signal train. A difunction signal train wherein the individual signals of the train are assigned values of either +1 or 0 is hereinafter referred to, on the other hand, as a monopolar difunction signal train. In the ensuing discussion, it is demonstrated that the difunction output signals from the identical converter of the present invention may be considered as representing either a monopolar or dipolar signal train by merely changing the difunction signal notation.

Some examples of the extremely useful application of difunction signal trains in the solution of mathematical operations and in the field of automatic controls are described and illustrated in copending U.S. patent applications. For example, in copending U.S. patent application Serial No. 388,780, for "Electronic Digital Differential Analyzer," by Floyd G. Steele, filed October 28, 1953, there is described a digital differential analyzer employing difunction signal trains for communicating between the integrators contained therein. Similarly, copending U.S. patent application Serial No. 311,609, for "Computer and Indicator System," by Floyd G. Steele, filed September 26, 1952, discloses the application of difunction representation to the field of process control and also discloses electronic computing circuits which operate directly to perform mathematical operations by combining difunction signals.

In order to fully realize the potential of difunction computing techniques, especially as applied to the field of process control and to the solution of real time problems, there is a need for conversion devices which can transform applied analog signals to equivalent difunction signal trains. Ordinarily what is desired in such an analog-to-difunction conversion is that the average value of the difunction signal train produced be proportional to the average value of the applied analog signal.

An analog-to-difunction converter which is operable in such manner to directly convert an applied analog signal to an equivalent difunction signal train having an average value proportional to the average of the analog signal is disclosed in copending U.S. patent application Serial No. 540,699, for "Analog-to-Difunction Converters," by Siegfried Hansen, filed October 17, 1955. The converters of the Hansen copending application are based upon the principle that a difunction signal train representing an applied analog input signal may be generated by integrating the analog input signal with respect to time, sampling at the end of each difunction signal period the integral developed and generating a first-valued difunction signal if the value of the integral exceeds a predetermined reference level and a second-valued difunction signal if the value of the integral is less than the reference level, and further subtracting from the integral a unit quantity during each signal period that a first-valued difunction signal is generated.

As is fully described in the Hansen copending application, if the average value of a difunction signal train is to be continuously proportional to the average value of an applied analog signal then over any given time interval the algebraic summation of the signal-values of the difunction signal train divided by the number of signals in the train must be proportional to the integral of the analog signal divided by the time interval. Accordingly, if the same time interval is employed for both the analog signal and the corresponding difunction signal train, then the summation of the difunction train is proportional to the integral of the analog signal.

The above analysis implies that the accuracy of a difunction signal train, in representing a corresponding analog signal, may be readily determined by directly comparing the summation of the difunction signal train with the integral of the corresponding analog signal over the same time intervals. Obviously, for the above to hold true, it must be assumed that the analog signal is first scaled to agree with the assigned values of the difunction signals. The result of the comparison therefore indicates the magnitude and sense of the difference between the average values of the difunction signal train and the corresponding analog signal. The above comparison therefore indicates the nature of the difunction signal that should be generated and added to the terminal end of the difunction signal train in order to cause the average value of the resultant difunction signal train to more nearly approach the average value of the analog signal. If after the first signal addition to the original difunction signal train, the summation of the resultant difunction train is again compared to the integral of the analog signal, the nature of a second difunction signal which may be added to the train to cause the two average values to more nearly approach each other may be determined. By continuously expanding the difunction train in the above manner, the average value of the difunction train approaches the average value of the analog signal.

In application of the above principles to the design of the converters of the Hansen copending application, the summation of the difunction signal train is effectively compared with the integral of the corresponding analog input signal at the end of each difunction signal period. However, the summation of the difunction signals is not actually independently generated nor is the integral of the analog signal independently generated. Instead a unit quantity is developed for each difunction signal generated and such unit quantities as they are formed are added or subtracted (in accordance with the value of the difunction signal) from the integral of the analog signal. In this mode of operation, the resultant integral does not represent the analog signal alone nor the difunction signals, but instead continuously represents the difference between the integral of the analog signals and the summation of the difunction signals previously generated. Accordingly, if the resultant integral being positive or negative respectively indicates that the summation of the difunction signal is greater or less than the integral of the analog signal, then the value of the next difunction signal to be generated may be determined from the sense of the resultant integral, it having a value which will tend to reduce the magnitude of the resultant integral and thus make the average value of the difunction signals more closely approach the average value of the analog signals.

The Hansen analog-to-difunction converter, mechanized in accordance with the above concepts, utilized an integrator for integrating the analog input signal and apparatus for subtracting therefrom quantities representing the difunction signals generated during successive periods, to thereby produce a resultant integral or a difference signal representing the difference between the integral of the analog signal and the summation of the difunction signal train thus far generated. The Hansen converter also utilized a comparator or sensing element, operative to sample the difference signal during each difunction signal period, for generating a first-valued difunction output signal if the difference signal exceeds a predetermined reference level and a second-valued difunction output signal if the difference signal was less than the reference level. A standard signal source was also utilized which was operable in response to each difunction signal generated for producing the quantity representing the difunction signal generated.

In the converters of the Hansen copending application, the integrator for integrating the applied analog signal includes an integrating capacitor which is charged at a rate and in a sense corresponding to the magnitude and polarity of an applied variable voltage analog signal. Standard unit charges are developed by a standard signal source for each difunction signal generated and these unit charges are dumped into the integrating capacitor so as to subtract from the integral of the analog signal. The resultant integral thus developed (which should ideally have nearly a null value) is sampled by the sensing element which includes a stabilized amplifier for amplifying the integral, a comparator circuit for comparing the amplified integral with a reference voltage at the end of each difunction signal period, and a difunction signal generator for generating a difunction signal during each difunction signal period in accordance with the result of the above comparison.

In one illustrated embodiment, a direct-current (D.C.) amplifier is employed, the output of which is fed to a logical "and" gating matrix. The logical "and" gating matrix is also responsive to a timing pulse marking the end of each difunction signal period as well as providing a reference level. As a result of a comparison of the amplified integral signal and the reference level of the timing pulses, triggering output signals are produced by the logical "and" circuit which triggers an associated bistable flip-flop. The output signals of the flip-flop represent the desired difunction output signals, which control the operation of the standard signal source so as to develop the feedback unit charges.

The standard signal source of the converters of the Hansen copending application is predicated on the basic concept that a standard unity quantity may be made available during each difunction period by applying a standard voltage to a standard capacitor during the preceding difunction signal period. The capacity of the standard capacitor is relatively small so that it becomes fully charged, i.e. charged to the limit established by the amplitude of the applied standard voltage during a fraction of a difunction signal period. In this way a standard charge becomes available during each succeeding period. By suitable switching means, the standard charge is selectively fed back (actually dumped) into the integrator at the end of each difunction signal period. In the converters described and illustrated in the Hansen copending application, electromagnetic relays, energized by the output signals of the sensing element, are employed in the standard signal source for selectively switching the charge on the standard capacitor into the integrating capacitor.

Although, as previously mentioned, the above described converters of the Hansen copending application afford a reasonably efficient method of converting an analog input signal to an equivalent difunction output signal train, there are certain inherent disadvantages of the Hansen converters which limit their application. By utilizing the charge developed across a standard capacitor by a standard voltage as the feedback signal to the integrating capacitor, the accuracy of the converter is limited by the accuracy and stability of the capacitor and the standard voltage source. Any drift in the capacitance of the capacitor due to temperature changes, or any appreciable variation in charge leakage of the capacitor results in a corresponding fluctuation in the quantity of charge available at the end of each difunction signal period. Further, the effect on the integral signal developed by the integrator, of each charge dumped from the standard capacitor into the integrating capacitor is dependent not only upon the magnitude of the charge so introduced but also upon the ratio of the capacitance of the two capacitors. Consequently, any variation in the ratio between the capacitance of these two capacitors also affects the accuracy of the converter.

An obvious limitation of the converters disclosed in the Hansen copending application is occasioned by the necessity of utilizing some form of switching circuit, such as electromagnetic relays, for selectively switching the standard unity charge from the standard capacitor into the integrating capacitor. Such switching circuitry is relatively bulky and moreover places an upper limit to the repetition rate or operation frequency of a converter. This is particularly true of conventional relay circuits which have very definite frequency or repetition rate limitations.

The present invention provides an analog-to-difunction converter which is markedly improved over the prior art Hansen converter. In accordance with the basic concepts of the present invention an analog input signal which is to be converted is transformed to a corresponding analog current signal. During each difunction signal period, a feedback current signal having an amplitude representative of the difunction signal generated during the period, is developed by a standard signal source and subtracted from the analog current signal. The resulting difference current signal is integrated in an integrator to produce a resultant integral signal which is sensed by a sensing element, the sensing element generating the next difunction signal in accordance with the sense of the integral signal.

Representing a marked improvement over the converters of the Hansen copending application, the feedback current signal is developed by the standard signal source of the present invention directly from the difunction signals generated by the sensing element and are continuously fed to the integrator. This is accomplished by clamping the difunction output voltage signals at predetermined levels to insure that each first-valued and second-valued difunction signals has the same voltage magnitude as other first-valued and second-valued difunction signals generated, respectively. The clamped difunction voltage signals are fed back to the integrator through a resistor to produce the desired feedback current signals. Since each difunction voltage signal is clamped at a constant predetermined voltage throughout the duration of a corresponding difunction signal period, a corresponding feedback current signal of constant magnitude is generated during the difunction signal period. Since the duration of each difunction signal period is constant, means is thereby provided for developing, during each difunction signal period, a feedback quantity representing the value of the difunction signal generated during the period.

In the above described manner, the standard signal source of the analog-to-digital converter of the present invention is reduced in complexity, its reliability is increased, and its frequency range is increased to a remarkable degree. By eliminating any need for a standard capacitor or for switching elements such as electromagnetic relays, obvious advantages are gained. The standard signal source is reduced to a clamping circuit and a resistor.

Although the present invention is not so limited, there is described herein an embodiment of the invention utilizing a transistor in the sensing element as both an amplifier for amplifying the integral signal produced by the integrator and as a comparator for comparing the amplified integral signal with a reference level. As a result of the comparison, a bistable flip-flop, included in the sensing element, is triggered to produce during each difunction signal period, a pair of complementary difunction output signals, one of the pair of signals representing the difunction output signal and the other the complement of the difunction signal. For reasons which will become apparent in the ensuing discussion, the feedback current signals are developed by the standard signal source from the complement of the difunction output signals rather than the difunction output signals themselves.

It is, therefore, an object of the present invention to provide an analog-to-difunction converter for directly converting an applied analog signal to a corresponding difunction signal train having a constant signal period by itegrating the applied analog signal to produce an integral signal, comparing the integral signal with a predetermined reference level during each signal period to produce a difunction signal, and subtracting from the integral during each signal period a quantity developed directly from and representing the value of the difunction signal produced during the period.

A further object of the present invention is to provide an analog-to-difunction converter of the above defined class wherein two currents are developed respectively proportional to the analog signal and the generated difunction signals, the difference of these currents being continuously integrated to determine successive difunction signal values.

Still another object of the present invention is to provide an analog-to-difunction converter of the above defined class wherein the sensing element includes a transistor and a bistable flip-flop.

It is also an object of the present invention to provide an analog-to-difunction converter of the above defined class wherein the output of the integrator utilized therein is connected to a succeeding sensing circuit only at the instant of sampling of the integrator output by the sensing element.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 2:
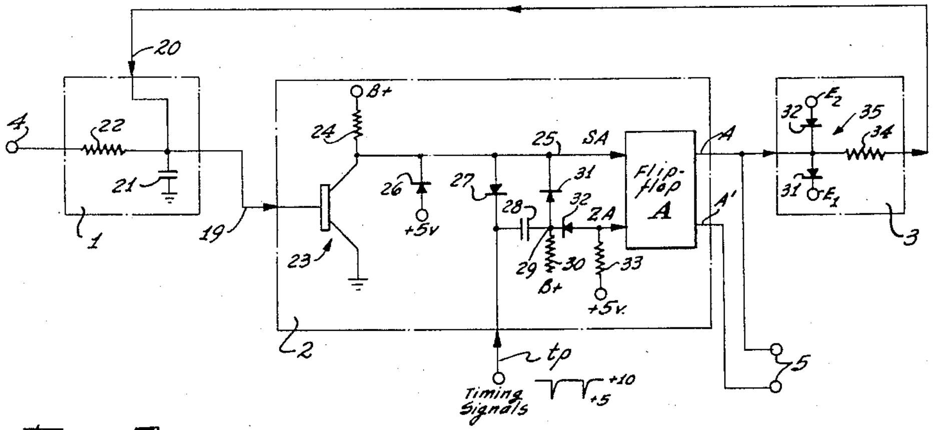
Fig. 2 is a circuit diagram, partly in schematic form, of an analog-to-difunction converter, according to the invention.
Figure 7:
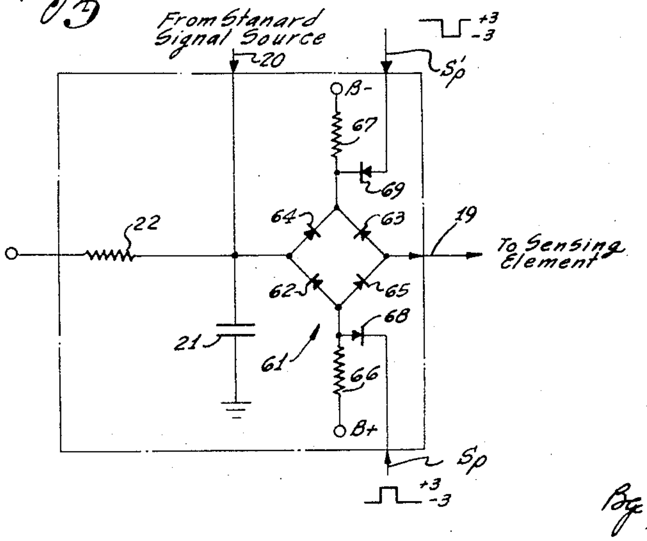
Figure 6:
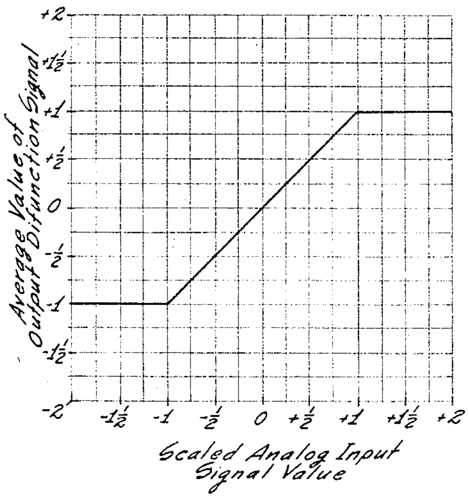

Figs. 3*a*, 3*b*, 4*a*, 4*b* and 5*a*, 5*b* are waveforms illustrating the operation of the circuit of Fig. 2;

Fig. 6 is a graph illustrating the relationship between the difunction signal trains generated by the analog-to-difunction converter of Fig. 2 in response to various analog input signals; and Fig. 7 is a circuit diagram of a modification of the integrator of circuit of Fig. 2.

Figure 1:
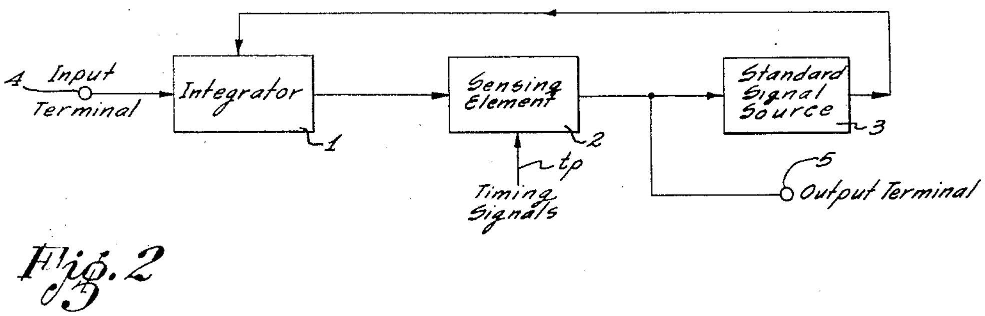
Fig. 1 is a block diagram illustrating the basic elements of the analog-to-difunction converter of the present invention.

With reference now to the drawings wherein like or corresponding parts are designated with like reference numerals throughout the several figures, there is shown in Fig. 1 a block diagram of the basic analog-to-difunction converter of the invention operable in response to impressed timing signals $t_p$ for generating at output terminal 5 a difunction output signal train representative of the amplitude and polarity of an input signal applied to input terminal 4. Timing signals $t_p$, generated by a timing signal source not shown, are periodically recurring clock or timing signals which synchronize the operation of the converter to delimit or mark-off successive difunction signal periods. As shown in Fig. 1, the converter includes three basic elements, namely, an integrator 1 which integrates the applied analog signal with respect to time, a sensing element 2 coupled to the integrator and operative to sample during each difunction signal period the integral developed for generating a first-valued difunction signal whenever the integral exceeds a predetermined reference level and a second-valued difunction signal whenever the integral is less than the reference level, and a standard signal source 3 coupled to the sensing element and operative in response to each difunction signal generated for developing a feedback signal representative of the value of the difunction signal generated, this feedback signal being applied back to integrator 1 in such manner as to subtract the feedback signal from the integral developed therein.

It is recognized that the basic converter of Fig. 1 is operable according to the fundamental principles of analog-to-difunction conversion heretofore discussed which are common to both the analog-to-difunction converters disclosed in the above mentioned Hansen copending U.S. application and to the improved analog-to-difunction converters of the present inventions. These fundamental principles having been previously discussed, there remains to be considered, therefore, the preferred embodiments of the improved analog-to-difunction converter of the present invention which are illustrated in the ensuing figures.

Accordingly reference is now made to Fig. 2, wherein there is shown one embodiment of an electronic analog-to-difunction converter according to the present invention operative to produce at output terminals 5 complementary difunction signal trains representative of the value of an analog signal E applied to input terminal 4. As is illustrated in Fig. 2, integrator 1 includes a capacitor 21 and a charging resistor 22 in series therewith having values such that the combination presents a conventional integrator circuit to applied analog voltage signal E. In such a circuit the resistor (here resistor 22) functions to produce a current proportional to the applied input signal E, this current being integrated by capacitor 21. Actually as shown in Fig. 2, the current flowing through resistor 22 is summed with a feedback current applied along a conductor 20, the resultant difference current being integrated by capacitor 21 of integrator 1.

The output of integrator 1 is applied by a lead 19 to the base region of an NPN transistor included in sensing element 2 and generally designated as 23. As indicated in Fig. 2, the collector of transistor 23 is connected to a positive ground referenced B+ supply through a current-limiting load resistor 24, the emitter of the transistor being connected directly to a reference voltage which is conveniently shown here as being ground potential level.

Also included in sensing element 2 is a bistable flip-flop A indicated as having a pair of inputs SA and ZA and a pair of outputs A and A′. In operation, flip-flop A is assumed to be responsive to the application of an input or triggering signal at input SA for setting to a conduction state corresponding to the production of a first-valued, relatively high level difunction signal at output A, and to the application of a signal at input ZA for setting to a conduction state corresponding to a first-valued, relatively high level difunction signal at output A′. In accordance with the operational characteristics of conventional bistable flip-flops, the output signals produced at each of the two flip-flop outputs are complementary to the output signals appearing at the other output. Hence a first-valued difunction signal appearing at output A is accompanied by a second-valued difunction signal at output A′ and vice-versa. As indicated, either the output signals appearing on output A′ or those appearing on A may be considered as representing the difunction output signals of the converter. The convention is followed that in a bipolar system, the application of a triggering signal at input SA of flip-flop A results in the production of −1 difunction output signal, and in a monopolar system a 0 difunction output signal. The application of a triggering signal at input ZA results in a +1 difunction output signal either bipolar or monopolar, being produced.

Continuing with a description of sensing element 2 of Fig. 2, timing signals $t_p$ are selectively applied as triggering signals to one or the other of inputs SA and ZA in accordance with the conduction state of transistor 23. More specifically, when transistor 23 is non-conductive, i.e. when the base region of the transistor is negative with respect to the ground potential of the emitter, timing signals $t_p$ are impressed on input SA of the flip-flops. Conversely, when transistor 23 is in the conductive state, i.e. when the base region is positive with respect to the emitter, signals $t_p$ are caused to be impressed on input ZA of flip-flop A. To accomplish this, the collector of transistor 23 is directly connected to the SA input of flip-flop A by lead 25 which is clamped at or above a lower potential limit of positive 5 volts by the application of a +5 volt potential, from a potential source not shown, to lead 25 through a clamping diode 26. It should be noted that diode 25 is symbolized in the conventional manner by an arrowhead and a transverse line where the arrowhead and line represent the anode and cathode terminals, respectively, of the diode. This conventional diode symbolization is followed throughout the ensuing discussion.

Timing signals $t_p$ are negative going, positive referenced timing pulses which are applied to lead 25 through a second clamping diode 27 poled, or illustrated, in a manned to cause the potential of lead 25 to be clamped at or below the reference level of the timing signals. By reference timing signals $t_p$ at +10 volts, lead 25 is thereby clamped, in the absence of timing pulses, at an upper limit of +10 volts by the timing signal reference voltage and at a lower limit of +5 volts by the applied +5 v. potential. For the above to apply, it is obvious that the B+ potential is at a higher (more positive) potential level than the +10 volt referenced level of the timing pulses. Thus when transistor 23 is cut-off, i.e. non-conducting, lead 25 is pulled-up to the upper-clamped value of +10 volts by the action of the B+ supply through resistor 24. Lead 25 is clamped at the lower-clamped value of +5 volts, on the other hand, when sufficient current is drawn by transistor 23 through resistor 24 to cause the potential on lead 25 to tend to drop below +5 volts.

Timing signals $t_p$ are also applied, by a capacitor 28, to the common junction 29 of a resistor 30 and diode 31 connected in series between the B+ supply and lead 25. Input ZA of flip-flop A is coupled to junction point 29 by a diode 32 and to the +5 v. supply by a resistor 33.

Consider now the operation of sensing element 2 in response to various level integral signals produced by integrator 1. Assume first that the integral signal produced by the integrator is negative with respect to the ground reference level to which the emitter of transistor 23 is connected. Transistor 23 will be accordingly cut-off or non-conducting. The potential on lead 25 will then be clamped at +10 volts representing the reference level of timing signals $t_p$. Both the anode and cathode of diode 27 will therefore be at the same potential and the first subsequent negative going timing pulse applied to the cathode of the diode will be transmitted to lead 25 and thence to the SA input of flip-flop A to cause a second-valued difunction output signal representing either a −1 or 0 to be generated on output A′. The above referred to negative timing pulse will also be coupled by capacitor 28 to junction point 29. However, junction point 29 will always be at the same potential level as lead 25 since the junction point is upper-clamped at the potential of lead 25 by diode 31, the junction point being pulled up to this clamped potential by the application of the B+ potential to the junction through resistor 30. Input ZA of the flip-flop being held at +5 volts by the application of the +5 v. potential through resistor 33, diode 32 is back-biased and thus inhibits the timing pulse from appearing on the ZA input of the flip-flop.

Assume next that the integral signal produced by integrator 1 is positive with respect to ground. Current is then conducted by transistor 23 from the B+ supply, through lead resistor 24 to ground. The voltage level of lead 25 is accordingly lowered and clamped at the +5 volt level. Since timing signals $t_p$ are referenced at +10 volts, diode 27 is back-biased blocking the timing pulses from reaching lead 25. Junction point 29, which as previously mentioned is at the potential of lead 25, references the timing pulses transmitted thereto by capacitor 28 at a +5 level. Accordingly, these negative going, +5 volt referenced pulses are inhibited by diode 31 from lead 25 and passed by diode 32 to the ZA input of flip-flop A.

In accordance with the fundamental principles of analog-to-difunction conversion previously discussed, a feedback quantity is subtracted from the integrator 1 during each difunction signal period representing the integral of the difunction signal generated during the period. As heretofore explained, this is accomplished in the converters disclosed in the Hansen copending U.S. application by initially developing a unit quantity charge in the capacitor included in the standard signal source of the converters and recharging the capacitor to the same charge during each subsequent difunction signal period. The unit quantity charge is obtained by applying initially and during each subsequent difunction signal period a standard voltage from a standard voltage source across the capacitor, the capacity of the capacitor being sufficiently small to cause the unit charge to be developed therein within a fraction of a difunction signal period. Either at the beginning of each difunction signal period or a fraction of a period thereafter, the difunction output signal generated is examined and dependent upon the value of the signal, the unit charge of the standard capacitor is selectively discharged into the integrating capacitor so as to cause the subtraction of the unit charge from the charge presented on the integrating capacitor.

In accordance with the concepts of the present invention, as previously discussed, on the other hand, the unit or feedback quantity formed is directly developed from the difunction signal generated. In this manner, the standard voltage source, the standard capacitor, and complicated relay switching circuits are eliminated from the standard signal source of the converter of the present invention. All that is required of the standard signal source is to stabilize the voltage levels of the difunction signals generated so that all first-valued signals have an equal predetermined constant magnitude through their respective difunction signal periods and that all second-valued signals are maintained at a second constant and equal magnitude throughout their respective difunction periods. By applying the stabilized difunction signals to the integrator through a proper resistor, a feedback current signal having a magnitude at all times representative of the difunction signal generated is obtained. This feedback current is summed with the current derived from the analog signal. The resultant difference current is applied to the integrating capacitor. As a result thereof a voltage is developed across the capacitor representative of the integral of the difference between the analog signal and the difunction signals.

With reference to Fig. 2, it will be shown that the difunction signals appearing on output A may be directly employed to develop the feedback current signals. The difunction signals generated at the A output of flip-flop A in the sensing element 2 are impressed on standard signal source 3, which in response thereto produces the desired feedback current signals that are fed back to the integrator by lead 20. Included in signal source 3 is an upper and lower clamping circuit, generally designated as 35, for stabilizing the difunction signals at predetermined upper and lower limits, and a resistor 34 for producing the desired feedback current signals from the stabilized difunction signals. Clamping circuit 35 comprises an upper clamping diode 31 for clamping the difunction signals at an upper limit of an applied $E_1$ potential and a lower clamping diode 32 for clamping the difunction at a lower limit of an applied $E_2$ potential. Since the converter of Fig. 2 is referenced to ground potential, it is apparent from the preceding discussion that the difunction signals may be conveniently clamped at equal potentials above and below ground potential. Accordingly, potential $E_1$ is equal and opposite in polarity to potential $E_2$.

In accordance with the principles of the analog-to-difunction conversion heretofore discussed, it is apparent that, disregarding sign or direction flow, the magnitude of the feedback current during each difunction signal period is a unity value substantially equal to the current which would be introduced into capacitors 21 of integrator 1 by an analog input signal having a magnitude representing unity. Stated another way, assume that the analog input signal E is first properly scaled between positive and negative values of +1 and −1, respectively. Disregarding the feedback current from the standard signal source, a value for resistor 22 of integrator 1 is then chosen which will cause a convenient uniform current to flow into integrating capacitor 21 throughout a complete difunction signal period in response to a unity value applied analog input signal E. This is accomplished by utilizing a comparatively large capacity integrating capacitor 21 and maintaining the resulting current relatively small through proper choice of resistor 22. In this manner, the voltage developed across capacitor 21 is maintained small in relation to the input voltage E during the difunction period, thereby causing the current flowing into capacitor 21 to be dependent primarily on the magnitude of the applied analog signal E and the value of resistor 22. The value of resistor 34 of signal source 3 is then selected to produce a unity feedback current, disregarding sign or direction of flow, from each stabilized difunction signal.

Figure 3A:
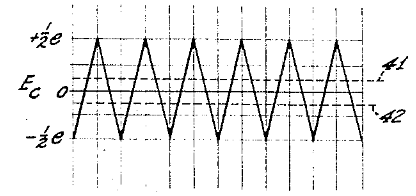
Figure 3B:
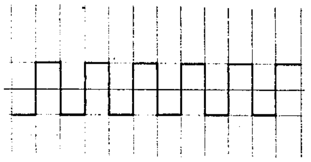
Figure 4A:
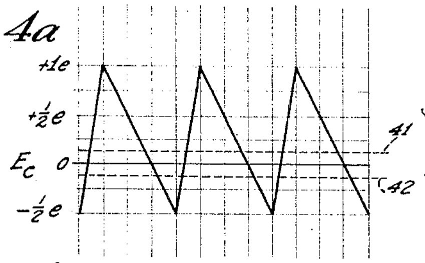
Figure 4B:
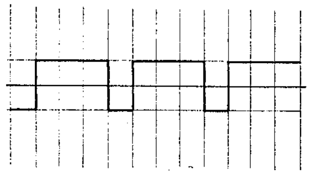
Figure 5A:
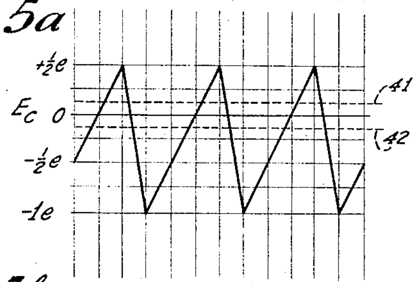

The waveforms which appear across capacitor 21 and the corresponding difunction output signals appearing on (the lower) terminal 5 for analog input signals of various magnitudes and polarities are illustrated in Figs. 3*a*—3*b*, 4*a*—4*b*, and 5*a*—5*b*. In each of Figs. 3*a*, 4*a* and 5*a*, illustrating the various waveforms across capacitor 21, there is shown a pair of dotted lines 41, 42 which represent the threshold voltages at the base region of transistor 23 below which the potential on lead 25 is not sufficiently altered to switch the timing signals $t_p$ from one input to the other of flip-flop A. Since the predetermined reference level about which the voltage across capacitor 22 should vary is ground potential, theoretically the threshold levels 41, 42 should both coincide with ground potential. In practice, however, some finite voltage above and below ground, in the order of millivolts, are required before transistor 23 is operative to swing the potential on lead 25 from one of its clamped limits to the other. For purposes of illustration, the threshold voltages are exaggerated in the drawings to better illustrate their effect.

It is noted that the voltage across capacitor 21 is illustrated in each of Figs. 3*a*, 4*a* and 5*a*, as having some initial negative value $-\frac{1}{2}e$ representing a residual negative charge remaining in the capacitor from previous operations of the converter. It is possible of course to provide means for initially completely discharging the capacitor before use of the converter. From the ensuing discussion, however, it will become apparent that this is neither necessary nor desirable. Accordingly, it is assumed throughout Figs. 3*a*, 4*a*, and 5*a* that capacitor 21 has an initial negative charge of $-\frac{1}{2}e$. For convenience in scaling the waveforms, it is further assumed that a voltage of magnitude *e* corresponds to the voltage which would appear across the capacitor at the end of a difunction signal period if the capacitor were initially discharged and an analog signal of constant unity value applied during the period, in the absence of a feedback signal. It will be recognized that the corollary of the above is defining the magnitude of *e* as the voltage developed across capacitor 21 during a difunction period as the result of the feedback current only.

Figure 5B:
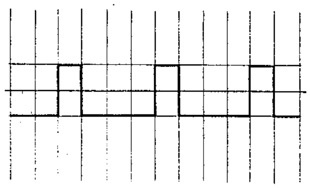

Since bistable flip-flop A must be in either one of two possible conduction states at all times, it is assumed that the flip-flop is initially in the conduction state to produce a second-valued signal, i.e. a −1 bipolar difunction signal and a 0 monopolar difunction signal, as illustrated in Figs. 3*b*, 4*b*, and 5*b*.

Referring particularly to Figs. 3*a*, and 3*b* there is shown the wave-form across capacitor 21 and the corresponding bipolar difunction output signals generated by the converter of Fig. 2 in response to an analog input signal E of zero volts. The analog input voltage being zero, the voltage appearing across the capacitor is controlled entirely by the feedback signal from signal source 3. Since a second-valued difunction output signal is generated during the first signal period, the corresponding feedback current signal will cause the voltage across the capacitor to be increased linearly with respect to time in a positive direction by a magnitude *e*. Consequently at the end of the first difunction signal period, the voltage $E_c$ across the capacitor will be at the value $+\frac{1}{2}e$. Since the voltage across capacitor 21 is then at a level $+\frac{1}{2}e$ above the reference level, at the end of the first difunction signal period, lead 25 is clamped at its lower potential limit and the timing pulse $t_p$ marking the end of the first period is transmitted to the ZA input of flip-flop A. Consequently the flip-flop is triggered to the conduction state wherein first-valued +1 difunction output signals are generated during the subsequent second difunction period as illustrated in Fig. 3b. The change in state of the flip-flop in turn results in reversing the sense or direction of flow of the feedback current to cause the voltage across capacitor 21 to be altered linearly in the negative direction during the ensuing difunction signal period of an amount *e*. Accordingly, at the end of the second difunction signal period, voltage $E_c$ is returned to its initial value of $-\frac{1}{2}e$ as illustrated in Fig. 3a. Voltage $E_c$ now being below the reference level, the timing pulse marking the end of the second difunction period is directed to the SA input of flip-flops A thus causing the conduction state of the flip-flop to be returned to the state represented by a second-valued or $-1$ output difunction signal being produced during the third difunction signal period as illustrated in Fig. 3b. The above described process is subsequently repeated during the ensuing difunction signal periods, voltage $E_c$ alternating increasing and decreasing linearly during each difunction signal period by a quantity *e* and the difunction output signals having alternately first and second values of $-1$, $+1$, $-1$, $+1$, . . . etc.

With reference to Figs. 4a and 4b, there is shown the waveforms across capacitor 21 and the corresponding bipolar difunction output signals for an applied analog input signal E of magnitude $+\frac{1}{2}$. As before, it is assumed that an initial voltage of $-\frac{1}{2}e$ appears across capacitor 21 due to the residual charge in the capacitor, and that flip-flop A is initially in the conduction state corresponding to the production of a $-1$ difunction output signal. Consequently, the feedback current signal from standard signal source 3 is such as to increase the voltage $E_c$ in a positive direction by a quantity *e* during the first difunction signal period. In addition, the $+\frac{1}{2}$ volt input signal E, which is constant throughout each signal period tends to change voltage $E_c$ in a positive direction by a quantity of $\frac{1}{2}e$ during each difunction signal period. The net result of the influence of both the feedback signal and the input signal E during the first difunction signal period, therefore, is to linearly change voltage $E_c$ in a positive direction by the quantity $1\frac{1}{2}e$. Thus at the end of the first difunction signal period, $E_c$ has a value of $+1e$ as illustrated in Fig. 4a. Since the value of $E_c$ is above the threshold levels 41, 42 at this time, the timing pulse $t_p$ marking the end of the first difunction period is impressed on the ZA input of flip-flop A triggering the flip-flop to its opposite state. Accordingly, a $+1$ difunction signal is produced during the second difunction signal period. The feedback signal during this period, therefore, tends to change the value of $E_c$ in a negative direction by the quantity *e*. Input signal E, having a constant value of $+\frac{1}{2}$ volts tends to change $E_c$ in the positive direction by a quantity $\frac{1}{2}e$. Accordingly the net result during the second difunction signal period is a change in the negative direction of $\frac{1}{2}e$, the value of $E_c$ at the end of the period therefore being $+\frac{1}{2}e$. Since the value of $E_c$ is still above the thresholds 41, 42 at this time, flip-flop A remains in the same state during the succeeding third difunction signal period. Thus during the third difunction period, $E_c$ is again changed in the negative direction by a quantity $\frac{1}{2}e$ resulting in a value of 0 or ground potential at the end of the period. Since $E_c$ is now within the threshold levels 41, 42, insufficient change in voltage level is experienced on lead 25 to redirect the third $t_p$ pulse, flip-flop A therefore remaining unchanged. Accordingly, during the fourth difunction signal period, $E_c$ is again changed in the negative direction by a quantity $\frac{1}{2}e$ bringing the value of $E_c$ to its initial value of $-\frac{1}{2}e$. Since flip-flop A is triggered at this time, the above defined process is repeated during each succeeding four signal period groups, as illustrated in Fig. 4a, resulting in the generation of the difunction output signals $-1$, $+1$, $+1$, $+1$; $-1$, $+1$, $+1$, $+1$, . . . etc. as appears in Fig. 4b.

In Figs. 5a and 5b, there is shown the waveform of voltage $E_c$ and the corresponding bipolar difunction output signals of the converter for an analog input signal E of $-\frac{1}{2}$ volt. During the first difunction signal period, the feedback signal tends to change voltage $E_c$ by a quantity *e* in a positive direction and the input signal E tends to change $E_c$ in a negative direction by a quantity $\frac{1}{2}e$. Consequently, at the end of the first difunction period, $E_c$ has a value of zero or ground potential. Since a zero value of $E_c$ is within the thresholds 41, 42, flip-flop A is unchanged. Accordingly, during the second difunction signal period, $E_c$ is again changed in a positive direction by a quantity $\frac{1}{2}e$ at the end of the period. This value of $E_c$ being above the thresholds 41, 42, flip-flop A is triggered to the opposite state. During the third difunction signal period, therefore, the combined influence of the feedback signal and the analog input signal E is to change $E_c$ in a negative direction by a quantity $1\frac{1}{2}e$. Accordingly at the end of the third difunction signal period, $E_c$ has a value of $-1e$. This value being below thresholds 41, 42, flip-flop A is returned to its original state. During the fourth signal period, therefore, voltage $E_c$ will be changed linearly in a positive direction by a quantity $\frac{1}{2}e$ to arrive at its original value of $-\frac{1}{2}e$ at the end of the period. The above process repeats during each succeeding group of four signal periods thus resulting in difunction output signals of $-1$, $-1$, $+1$, $-1$; $-1$, $-1$, $+1$, $-1$; . . . etc.

Although it has been heretofore assumed that the difunction signal trains produced by the analog-to-difunction converter of the present invention are bipolar signal trains wherein the individual signals have values of either $+1$ or $-1$, it should be readily apparent that both other valued difunction signal trains and monopolar signal trains may be generated by the identical converter illustrated in Fig. 2 without any structural change whatsoever in the converter being required. The problem is merely one of scaling the analog input signal E to coincide with the value assigned to the signals of the corresponding difunction signal train. For example, if an analog signal having a range of $+100$ to $-100$ is to be represented by a bipolar $+1$, $-1$ difunction signal train, then the analog input signal is scaled so that a $+1$ difunction signal corresponds to $+100$ volts and a $-1$ difunction signal corresponds to $-100$ volts. If on the other hand, the above analog signal is to be represented by a monopolar $+1$, 0 difunction signal train, then the analog input signal is scaled so that a $+1$ difunction signal corresponds to $+100$ volts, and a 0 difunction signal corresponds to $-100$ volts. Accordingly, a $+\frac{1}{2}$ average value for a monopolar difunction signal train, in conformity with the latter scaling, represents an analog input signal of zero volts.

Other scaling relationships are readily suggested from the above. For example, an analog voltage range of $+100$ to $-50$ may be scaled to either a bipolar or monopolar difunction train representative thereof. In a $+1$, $-\frac{1}{2}$ bipolar difunction train, the analog signal may be scaled so that a $+1$ difunction corresponds to $+100$ volts, and a $-\frac{1}{2}$ difunction signal to $-50$ volts. On the other hand, monopolar $+1$, 0 difunction signals may be employed where a $+1$ difunction signal corresponds to $+100$ volts and a 0 difunction signal corresponds to $-50$ volts. A signal train having an average value of $+\frac{1}{3}$ would therefore, correspond to 0 volts.

It is interesting to note the overall relationship of the average value of a difunction signal train generated by the analog-to-difunction converter of the present invention in response to analog input signals having magnitudes both inside and outside the scaled range of the converter. Accordingly, reference is made to Fig. 6 showing a a graph of the average value of bipolar $+1$, $-1$ difunction output signal trains generated by the converter of the present invention in response to applied analog input signals ranging from a scaled or relative $-2$ value to a $+2$ value. From the previous discussion, it is evident that a $+1$, $-1$ difunction signal train has a range from −1 represented by all −1 difunction signals to +1 represented by all +1 difunction signals. Between thse limits, the average value of the difunction signal train is proportional to the scaled value of the analog input signal as illustrated in the graph where the scaled values of the analog input signal are plotted on the abscissa and the average value of the corresponding difunction signal train is plotted on the ordinate of the graph.

Since the average value of a +1, −1 difunction signal train cannot exceed a +1 or −1, however, a scaled analog input signal that exceeds these limits can only result in a corresponding +1 or −1 average-valued difunction signal train. Accordingly, as illustrated in the graph, any scaled analog input signal greater than +1 results in the generation of a difunction signal train of all +1 difunction signals having an average +1 value, and conversely a scaled analog signal more negative than −1 will be represented by a −1 average-valued difunction signal train. This suggests that the apparatus of the present invention may be considered as having a dual application. Within the scaled ranges of the assigned difunction signal values, i.e. herein +1 and −1, the apparatus functions as a proportional analog-to-difunction converter. Outside this range, the apparatus functions non-linearly as a generator of a full rate correction signal indicative of the sense of the applied analog signal. Such apparatus readily lends itself to operation with dual mode servo control systems.

Returning to Fig. 2, it is apparent from the preceding discussion that any leakage of the charge in capacitor 21 during the operation of the converter will affect the accuracy of integrator 1 and hence the reliability of the entire converter. Since the normal nulling operation of the converter tends always to keep the voltage on the capacitor very near zero, the self leakage of the capacitor will be negligible. A more serious problem in some applications of the converter, however, may be the leakage of charge from capacitor 21 through the base region to the emitter of transistor 23. Obviously, the quantity of charge which may be drained from the capacitor in this manner during any given time interval will be, among other things, a function of the duration of the interval. Accordingly, the shorter the time interval the less this leakage. Since, in accordance with the concepts of the present invention heretofore discussed, it is only necessary to ascertain the value of the integral, i.e. voltage $E_c$, at the end of each difunction signal period for a time interval sufficient to direct a corresponding timing pulse $t_p$ to the appropriate input of flip-flop A, a sampling technique whereby integrator 1 is disconnected from sensing element 2 at all times except from this required interval at the end of each difunction signal period is suggested.

Accordingly reference is made to Fig. 7 illustrating a modification of the integrator of the present invention substantially reducing possible charge leakage from storage capacitor 21 contained therein through transistor 23 of sensing element 2. This is accomplished by including in integrator 1 a diode gating bridge generally designated 61 which is responsive to applied complementary sampling pulses $S_p$ and $S_p'$ for successively coupling and decoupling integrating capacitor 21 from output lead 17 of the integrator. Complementary sampling pulses $S_p$, $S_p'$ are relatively short-duration pairs of complementary pulses generated by a sampling pulse generator not shown, at the end of each difunction signal period coincident with a corresponding time pulse $t_p$.

Diode gate 61 includes four diodes 62, 63, 64 and 65 connected in a diode bridge to form upper, lower, left-hand and right-hand terminal junctions as shown. The left-hand terminal of the bridge is directly connected to the upper terminal of capacitor 21, output lead 19 being connected to the right-hand terminal. A B+ and a B− potential are applied to the lower and upper terminals of the bridge, respectively, through corresponding current limiting resistors 66, 67. Sampling pulses $S_p$ are coupled to the lower terminal of the bridge by a clamping diode 68, and complementary sampling pulses $S_p'$ are coupled to the upper terminal of the bridge through a second clamping diode 69.

Sampling pulses $S_p$ are referenced at a convenient negative (below ground) potential and are substantially rectangular positive going pulses having a peak positive amplitude substantially equal in magnitude to the negative magnitude of the reference voltage. Complementary sampling pulses $S_p'$, on the other hand have a positive reference level equal to the peak amplitude of pulses $S_p$ and are rectangular, negative going pulses having a peak negative value substantially equal to the negative reference level of pulses $S_p$. Both the negative and the positive reference levels above are chosen to be larger in magnitude than any possible magnitude of the voltage across capacitor 21 in the negative and positive direction, respectively.

In the absence of a sampling pulse, it is evident that the lower terminal of the diode bridge will be clamped at the reference level of pulses $S_p$ and the upper terminal will be clamped at the reference level of pulses $S_p'$. Under these conditions all diodes, 62 to 65, of the bridge are back biased. Consequently no current flows through the legs of the bridge, and the potential on the left-hand terminal of the bridge, i.e. output lead 19 remains constant at somewhere between the reference levels of the complementary coupling pulses and is unaffected by the voltage across capacitor 21. By selecting diodes 63, 65 as a matched pair, the potential on lead 19 may be maintained at midway between the reference level of signals $S_p$ and $S_p'$ and hence at ground potential.

Consider now the action of the diode gating bridge 61 during application of a pair of complementary sampling pulses $S_p$, $S_p'$. Both diodes 68 and 69 are then back-biased and hence no longer function as clamping elements at this time leaving the upper and lower terminals of the diode bridge unclamped by the sampling pulses. As a result, the upper terminal of the bridge will tend to go more negative and the lower terminal to go positive. Since the voltage on the upper terminal of capacitor 21 will always be small in magnitude as compared to the magnitude of the potential of the B+ and B− supply, diodes 62 and 64 will both be forward biased with respect to the potential of capacitor 21. Consequently, diodes 62, 64 act as clamping diodes at this time clamping both the upper and lower terminal of the diode bridge at the potential across capacitor 21. The potential at both the upper and lower terminals of the diode bridge being at the same potential, this desired potential, i.e. the potential across integrating capacitor 21, will appear on output lead 19. The diode bridge gate 61, accordingly, operates as a switching circuit for normally disconnecting integrating capacitor 21 from output lead 19 and for coupling the capacitor to the output lead only during application of each pair of complementary sampling pulses $S_p$, $S_p'$ impressed thereon.

What is claimed as new is:

1. An analog-to-difunction converter for converting an applied analog signal to an equivalent difunction signal train of first and second valued difunction signals, each difunction signal being produced during a predetermined signal period; said converter comprising: an integrator for receiving the applied analog signal and for producing in response thereto an integral signal representing the integral with respect to time of the analog signal, said integrator further including means responsive to application of a predetermined feedback signal for continuously subtracting from said integral signal the integral with respect to time of the feedback signal to produce a corresponding difference integral signal; a sensing element coupled to said integrator for sampling said difference integral signal once during each signal period to produce a first-valued difunction signal when the sampled difference integral signal exceeds a predetermined level and a second-valued difunction signal when the sampled difference integral signal is less than said predetermined level; a standard signal source coupled to said sensing element and responsive to the difunction signals for directly producing therefrom the predetermined feedback signal; and signal applying means coupled to said standard signal source and said integrator for continuously applying the feedback signal to said integrator.

2. An analog-to-difunction converter for generating a difunction signal train of first and second-valued difunction signals having an average value corresponding to the value of an applied analog signal, each difunction signal of the train being produced during a predetermined signal period; said converter comprising: a sensing element for generating a difunction signal during each signal period; and means coupled to said sensing element and responsive to the applied analog signal and said difunction signals generated by said sensing element for producing a difference signal directly from the analog signal and said difunction signals representing at the end of each difunction signal period the difference between the average value of the analog signal and the average value of all difunction signals previously generated by said sensing element, said sensing element being responsive to said difference signal to generate a first-valued difunction signal when said difference signal exceeds a predetermined level and to generate a second-valued difunction signal when said difference signal is less than said predetermined level thereby to reduce during each signal period the magnitude of said difference signal.

3. An analog-to-difunction converter for receiving an applied analog signal and producing in response thereto a difunction signal train of first and second valued difunction signals, each successive difunction signal of the train being produced during correspondingly successive predetermined difunction signal periods; said converter comprising: first means operative in response to an impressed difference input signal for developing an integral signal corresponding to the integral with respect to time of said difference input signal; second means coupled to said first means and operative in response to said integral signal for producing a first-valued difunction signal during each signal period that said integral signal exceeds a predetermined level and for producing a second-valued difunction signal during each signal period that said integral signal is less than said predetermined level; and third means coupled to said first and second means and responsive to said difunction signals and the analog signal for producing said difference input signal as the difference between said analog signal and said difunction signals.

4. The analog-to-difunction converted defined in claim 3 wherein said third means includes a nulling terminal, a signal source including first resistance means, said signal source being coupled to said nulling terminal and responsive to said difunction signals for applying to said nulling terminal through said first resistance means a first current proportional to said difunction signals, second resistance means coupled to said nulling terminal and responsive to the analog signal for applying to said nulling terminal a second current proportional to said analog signal thereby developing at said nulling terminal a difference current, said difference current constituting said input signal.

5. The analog-to-difunction converter defined in claim 3 wherein said input signal is a current signal; and wherein first means includes a capacitor for receiving said current signal and for producing in response thereto a voltage signal corresponding in amplitude to the integral with respect to time of said current signal, the voltage signal constituting said integral signal.

6. The analog-to-difunction converter defined in claim 4 wherein said first means includes a capacitor coupled to said nulling terminal and responsive to said difference current for integrating said difference current to produce a voltage signal at said nulling terminal corresponding in amplitude to the integral with respect to time of said difference current, said voltage signal constituting said integral signal.

7. The analog-to-difunction converter defined in claim 6 wherein said second means includes a transistor and a difunction signal generator, said transistor having a base region directly connected to said nulling terminal, and an emitter maintained at said predetermined reference level, said transistor being operable in response to said integral signal for producing at the collector thereof a control signal, said difunction signal generator being coupled to said transistor and responsive to said control signal for producing the difunctional signal train.

8. The analog-to-difunction converter defined in claim 4 wherein said signal source further includes a clamping circuit responsive to said difunction signals for stabilizing the amplitude of said signals, said resistance means being coupled to said clamping circuit and responsive to said stabilized difunction signals for producing said first current.

9. An electronic analog-to-difunction converter for converting an applied analog signal to an equivalent difunction signal train or first and second-valued difunction output signals, each difunction output signal being produced during a predetermined difunction signal period; said converter comprising: an integrator for receiving the applied analog signal and for producing an integral signal representing the integral with respect to time of the analog signal; said integrator including means responsive to application of a predetermined feedback signal for subtracting from said integral signal during each difunction signal period, the integral with respect to time of the feedback signal to produce a resultant difference integral signal; a sensing element coupled to said integrator and responsive to said difference integral signal for producing a first-valued difunction signal during each signal period that said difference integral signal exceeds a predetermined reference level, and a second-valued difunction signal during each difunction signal period that said difference integral signal is less than said predetermined level; and a standard signal source coupled to said sensing element and said integrator including first means responsive to the difunction signals for directly producing therefrom the predetermined feedback signal, and second means coupled to said first means for applying the feedback signal to said integrator.

10. The analog-to-difunction converter defined in claim 9 wherein said sensing element includes a bistable flip-flop responsive to first and second control signals for producing, respectively, first and second-valued difunctional signals, and a transistor circuit coupled to said bistable flip-flop and responsive to said difference integral signal for producing one of said control signals during each difunction signal period, said transistor circuit producing said first control signals when said difference integral signal exceeds said predetermined level and for producing said second control signals when said difference integral signal is less than said predetermined level.

11. The analog-to-difunction converter defined in claim 9 wherein each of said difunction values is represented by a difunction output signal and a complementary difunction signal and wherein said first means includes an upper and lower voltage clamp for stabilizing the amplitude of said complementary difunction signals to produce said feedback signals, and wherein said second means includes a resistor coupled between said first means and said integrator for applying said feedback signal to said integrator.

12. The analog-to-difunction converter defined in claim 9 wherein said integrator includes an integrating capacitor and a resistor connected in series for receiving the applied analog signal and for developing across said capacitor a voltage signal representing the integral with respect to time of the applied analog signal, and wherein said integrator further includes an output lead and a sampling gate coupled between said integrating capacitor and said output lead for gating said voltage signal to said output lead at the end of each difunction signal period to form said integral signal on said output lead.

13. An electronic analog-to-difunction converter for converting an applied analog signal to a representative difunction signal train, each successive difunction signal having a first or a second value and being produced during correspondingly successive predetermined difunction signal periods; said converter comprising: an integrator including an integrating capacitor and resistor connected in series for receiving the applied analog signal and for developing a voltage signal across said capacitor representing the integral with respect to time of the analog signal; an output lead; and a gating circuit coupled between said capacitor and said output lead and operable in response to applied sampling pulses for gating said voltage signal to said output lead at the end of each difunction signal period to produce on said output lead an integral signal; a sensing element including a transistor circuit and a bistable flip-flop, said transistor circuit being coupled to said bistable flip-flop and responsive to said integral signal for triggering said flip-flop at the end of each difunction signal period to a first conduction state when said integral signal exceeds a predetermined reference level and to a second conduction state when said integral signal is less than said predetermined reference level, said bistable flip-flop producing a first-valued and a second-valued difunction signal when in said first and said second conduction states, respectively; and a standard signal source including an upper-lower voltage clamping circuit coupled to said sensing element and responsive to said difunction signals for clamping said difunction signals to produce stabilized-magnitude bivalued signals; and a resistor connected between said clamping circuit and said capacitor for applying to said capacitor during each difunction signal period a current proportional to the value of the stabilized-magnitude bivalued signal produced by said sensing element during said signal period.

14. A converter for producing a series of first and second-valued difunction current signals representative of an applied voltage signal A each successive difunction signal being produced during correspondingly successive predetermined difunction signal periods, said converter producing a series of difunction signals having an average value representing analog signal A when the analog signal has a level less than or equal to a predetermined first level $E_1$ and greater than or equal to a predetermined second level $E_2$, producing a series of all first-valued difunction signals when the analog signal has a level greater than $E_1$ and producing a series of all second-valued difunction signals when the analog signal has a level less than $E_2$, said converter comprising: first means responsive to an integral signal and to timing pulses demarking each difunction signal period for producing a first-valued difunction current signal equal to $KE_2$ (where K is a predetermined constant) during each signal period that said integral signal is less than a predetermined reference value and a second-valued difunction current signal equal to $KE_1$ during each difunction signal period that said integral signal exceeds said reference value; second means responsive to the analog voltage signal for producing a corresponding analog signal equal to KA, third means coupled to said first and second means and responsive to said difunction current signals and said analog current signals for summing said difunction current signals with said analog current signals to produce a difference current; and fourth means coupled to said first and third means and responsive to said difference current for producing said integral signal as the integral with respect to time of said difference current.

15. An analog-to-difunction converter for converting an applied analog signal to a series of bivalued difunction signals synchronized with respect to applied signals of predetermined period T, one difunction signal being produced during each period T and having an assigned value of plus one or minus one, the average value of the difunction signals being proportional to the average value of the analog signal, said converter comprising: means for converting the analog signal to an analog current signal, an integrator coupled to said first means and responsive to said analog current signal and to application of a bipolar unit current signal for producing in response thereto a resultant integral signal representing the integral with respect to time of the algebraic sum of said analog current signal and the unit current signal; a sensing element coupled to said integrator and responsive to each timing signal for generating in each period T a plus one difunction signal if said resultant integral signal exceeds a predetermined reference level and a minus one difunction signal if said integral signal is less than the reference level; and a standard signal source coupled to said sensing element for developing the unit current signal during each difunction signal period directly from said difunction signals, and for applying the unit current signal to said integrator, said signal source developing said unit current signal poled so as to subtract from said analog current signal during each signal period that a plus one difunction signal is generated, and developing said unit current signal poled so as to add to said analog current signal during each signal period that a minus one difunction signal is generated thereby to cause said resultant integral signal to represent the difference between the average value of the analog and the average value of the difunction signals.

16. An analog-to-difunction converter for converting an applied analog signal to a series of first and second-valued difunction signals, each difunction signal being produced during a predetermined difunction signal period; said converter comprising: an integrator responsive to the applied analog signal and to application of a feedback quantity for producing a difference integral signal corresponding to the integral with respect to time of the difference of the applied analog signal and the feedback quantity; a sensing element responsive to said difference integral signal for generating a first and a second-valued difunction signal during each difunction signal period that said difference integral signal is greater than and less than, respectively, a predetermined reference level; gating means coupled between said integrator and said sensing element and responsive to applied sampling signals for impressing said difference integral signal on said sensing element once during each difunction signal period for a sampling period representing a fraction of a difunction signal period; a standard signal source coupled to said sensing element and said integrator and responsive to said difunction signals for producing the feedback quantity during each difunction signal period, the feedback quantity corresponding in magnitude to the integral with respect to time of the value of the difunction signal generated during each difunction signal period, said standard signal source further including means for applying the feedback quantity to said integrator.

17. The analog-to-difunction converter defined in claim 16 wherein said sampling signals include complementary pairs of sampling pulses, each of said pairs occurring during a corresponding sampling period; and wherein said gating means includes a diode bridge circuit responsive to said complementary sampling pulses for coupling said integrator to said sensing element during each of said pairs of sampling pulses and decoupling said integrator from said sensing element at all other times.

References Cited in the file of this patent

UNITED STATES PATENTS 2,362,503 Scott ---------------- Nov. 14, 1944
2,706,270 Steele ---------------- Apr. 12, 1955